US012583435B2

(12) United States Patent
Kharpuri et al.

(10) Patent No.: US 12,583,435 B2
(45) Date of Patent: Mar. 24, 2026

(54) TECHNIQUES FOR MANAGING POWER DISTRIBUTION BETWEEN ELECTRIFIED VEHICLE LOADS AND HIGH VOLTAGE BATTERY SYSTEM DURING LOW STATE OF CHARGE CONDITIONS

(71) Applicant: FCA US LLC, Auburn Hills, MI (US)

(72) Inventors: Rudolf Kharpuri, Auburn Hills, MI (US); Venkatasubramanian Sankara Raman, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 274 days.

(21) Appl. No.: 18/344,960

(22) Filed: Jun. 30, 2023

(65) Prior Publication Data

US 2025/0001999 A1 Jan. 2, 2025

(51) Int. Cl.
| | |
|---|---|
| B60L 9/00 | (2019.01) |
| B60K 6/52 | (2007.10) |
| B60W 10/08 | (2006.01) |
| B60W 10/30 | (2006.01) |
| B60W 20/13 | (2016.01) |

(52) U.S. Cl.
CPC .............. B60W 20/13 (2016.01); B60K 6/52 (2013.01); B60W 10/08 (2013.01); B60W 10/30 (2013.01); B60W 2510/244 (2013.01); B60Y 2200/92 (2013.01); B60Y 2400/82 (2013.01)

(58) Field of Classification Search
CPC ...... B60W 20/13; B60W 10/08; B60W 10/30; B60W 2510/244; B60K 6/52; B60Y 2200/92; B60Y 2400/82
See application file for complete search history.

(56) References Cited

U.S. PATENT DOCUMENTS

| | | | |
|---|---|---|---|
| 8,467,936 B2 | 6/2013 | Wijaya et al. | |
| 8,909,399 B2 * | 12/2014 | Kato ................... | B60L 15/2045 |
| | | | 180/65.265 |
| 9,475,486 B2 * | 10/2016 | Tamagawa .............. | B60L 50/15 |
| 9,545,854 B2 | 1/2017 | Daum et al. | |
| 10,086,818 B2 * | 10/2018 | Bolenbaugh .......... | B60W 10/30 |
| 10,377,389 B2 | 8/2019 | Bryan et al. | |
| 10,985,589 B2 | 4/2021 | Zhou | |
| 11,345,331 B2 | 5/2022 | McKibben et al. | |

FOREIGN PATENT DOCUMENTS

DE        102017214272 A1    2/2018

* cited by examiner

*Primary Examiner* — Adam M Alharbi

(74) *Attorney, Agent, or Firm* — Jeremy J. Klobucar

(57) ABSTRACT

Electrified vehicle energy management techniques include determining when a state of charge (SOC) of a high voltage (HV) battery system is below an SOC threshold and, in response, determining whether an electric motor is operating as a generator or a consumer, when the electric motor is operating as a consumer, calculating a power offset value based on a difference between an available power of the HV battery system and a set of HV loads, when the electric motor is operating as a generator and its generated power is less than the set of HV loads, calculating the power offset value based on a difference between the generated power and the set of HV loads, and controlling the set of HV loads using a final output power calculated based on the power offset value and a minimum power for the set of HV loads.

16 Claims, 2 Drawing Sheets

TECHNIQUES FOR MANAGING POWER DISTRIBUTION BETWEEN ELECTRIFIED VEHICLE LOADS AND HIGH VOLTAGE BATTERY SYSTEM DURING LOW STATE OF CHARGE CONDITIONS

FIELD

The present application generally relates to electrified vehicles and, more particularly, to techniques for managing power distribution between electrified vehicle (e.g., hybrid electric vehicle) loads and its high voltage battery system during low state of charge (SOC) conditions.

BACKGROUND

An electrified vehicle has an electrified powertrain including one or more high voltage (HV) battery systems connected to respective HV buses that provide electrical power to respective electric motors. For plug-in hybrid electrified vehicles (PHEVs), the battery system(s) are periodically recharged via roadside or residential charging stations. Recharging is also often performed during operation of the electrified vehicle. This includes operating one of the electric motors associated with an internal combustion engine as a torque consumer, thereby converting the mechanical energy generated by the engine into electrical energy for the HV bus. HV loads are also connected to and selectively powered by the HV bus. Non-limiting examples of these HV loads include heating/ventilation/air conditioning (HVAC) system components such as compressors, heaters, and fans.

During low SOC conditions of the HV battery system(s) and high HV load conditions, the engine and electric motor may be unable to keep up with the demand on the HV bus (e.g., unable to generate enough mechanical energy for both vehicle propulsion and conversion to electrical energy), which could result in the electrified vehicle shutting down. Shutting down the electrified vehicle, even at least temporarily, is undesirable. At least some of these HV loads could also be disabled during such conditions, which is also undesirable and potentially uncomfortable for the driver (e.g., a lack of proper HVAC control in the cabin environment). Accordingly, while such conventional electrified vehicle energy management systems do work well for their intended purpose, there exists an opportunity for improvement in the relevant art.

SUMMARY

According to one example aspect of the invention, an energy management system for an electrified vehicle having an electrified powertrain including an electric motor connected to an internal combustion engine is presented. In one exemplary implementation, the energy management system comprises a set of sensors configured to obtain a set of parameters of the electrified powertrain indicative of (i) a state of charge (SOC) of a high voltage (HV) battery system connected to a HV bus that provides/receives electrical power to/from the electric motor and (ii) a set of HV loads on the HV bus corresponding to a set of HV components connected to the HV bus and a control system in communication with the set of sensors and configured to determine whether the SOC of the HV battery system is below an SOC threshold and, when the SOC of the HV battery system is below the SOC threshold, determine whether the electric motor is operating as a generator or a consumer, when the electric motor is operating as a consumer, calculate a power offset value based on a difference between an available power of the HV battery system and the set of HV loads, when the electric motor is operating as a generator and its generated power is less than the set of HV loads, calculate the power offset value based on a difference between the generated power and the set of HV loads, and control the set of HV loads using a final output power calculated based on the power offset value and a minimum power for the set of HV loads.

In some implementations, the controller is further configured to when the electric motor is operating as a generator and its generated power is greater than the set of HV loads, set the power offset value to zero. In some implementations, the control of the set of HV loads using the final output power includes providing at least some of the set of HV loads less power than desired. In some implementations, the control of the set of HV loads using the final output power includes disabling at least one of the set of HV loads that is not identified as a critical HV load.

In some implementations, the set of HV loads includes a direct current to direct current (DC-DC) converter. In some implementations, the set of HV loads include an electric air compressor. In some implementations, the set of HV loads includes an electric coolant heater. In some implementations, wherein the electrified vehicle is a plug-in hybrid electric vehicle (PHEV) having the engine and a first electric motor associated with a transmission and a first axle and a second electric motor associated with a different second axle.

According to another aspect of the invention, an energy management method for an electrified vehicle having an electrified powertrain including an electric motor connected to an internal combustion engine is presented. In one exemplary implementation, the energy management method comprises providing a set of sensors configured to obtain a set of parameters of the electrified powertrain indicative of (i) an SOC of an HV battery system connected to a HV bus that provides/receives electrical power to/from the electric motor and (ii) a set of HV loads on the HV bus corresponding to a set of HV components connected to the HV bus, determining, by a control system and using a set of sensors, whether the SOC of the HV battery system is below an SOC threshold, and, when the SOC of the HV battery system is below the SOC threshold, determining, by the control system, whether the electric motor is operating as a generator or a consumer, when the electric motor is operating as a consumer, calculating, by the control system, a power offset value based on a difference between an available power of the HV battery system and the set of HV loads, when the electric motor is operating as a generator and its generated power is less than the set of HV loads, calculating, by the control system, the power offset value based on a difference between the generated power and the set of HV loads, and controlling, by the control system, the set of HV loads using a final output power calculated based on the power offset value and a minimum power for the set of HV loads.

In some implementations, the method further comprises when the electric motor is operating as a generator and its generated power is greater than the set of HV loads, setting, by the control system, the power offset value to zero. In some implementations, the controlling of the set of HV loads using the final output power includes providing at least some of the set of HV loads less power than desired. In some implementations, the controlling of the set of HV loads using the final output power includes disabling at least one of the set of HV loads that is not identified as a critical HV load.

In some implementations, the set of HV loads includes a DC-DC converter. In some implementations, the set of HV loads include an electric air compressor. In some implementations, the set of HV loads includes an electric coolant heater. In some implementations, the electrified vehicle is a PHEV having the engine and a first electric motor associated with a transmission and a first axle and a second electric motor associated with a different second axle.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, during low state of charge (SOC) conditions of high voltage (HV) battery system(s) and high HV load conditions in an electrified vehicle, an engine and an electric motor may be unable to keep up with the demand on an HV bus (e.g., unable to generate enough mechanical energy for both vehicle propulsion and conversion to electrical energy), which could result in the electrified vehicle shutting down. Shutting down the electrified vehicle, even at least temporarily, is extremely undesirable. At least some of these HV loads could also be disabled during such conditions, which is also undesirable and potentially uncomfortable for the driver (e.g., a lack of proper heating, ventilation, and air conditioning, or HVAC, control in the cabin environment). Accordingly, the present application is directed to techniques that determine a power offset based on whether the electric motor connected is operating as a generator or a consumer. When the electric motor is generating power that is less than the HV loads, the power offset is calculated based on a difference between the generated power and the HV loads. When the generated power is greater than the HV loads, there is no power offset. The power offset is calculated based on a difference between available HV battery system power and the HV loads. The final discharge power is then calculated based on the minimum power required for operating the HV loads and the power offset. These techniques ensure that the electrified vehicle is able to remain operational while also providing at least a minimum amount of power to critical HV loads, thereby improving the driver's comfort and overall driving experience.

Figure 1:
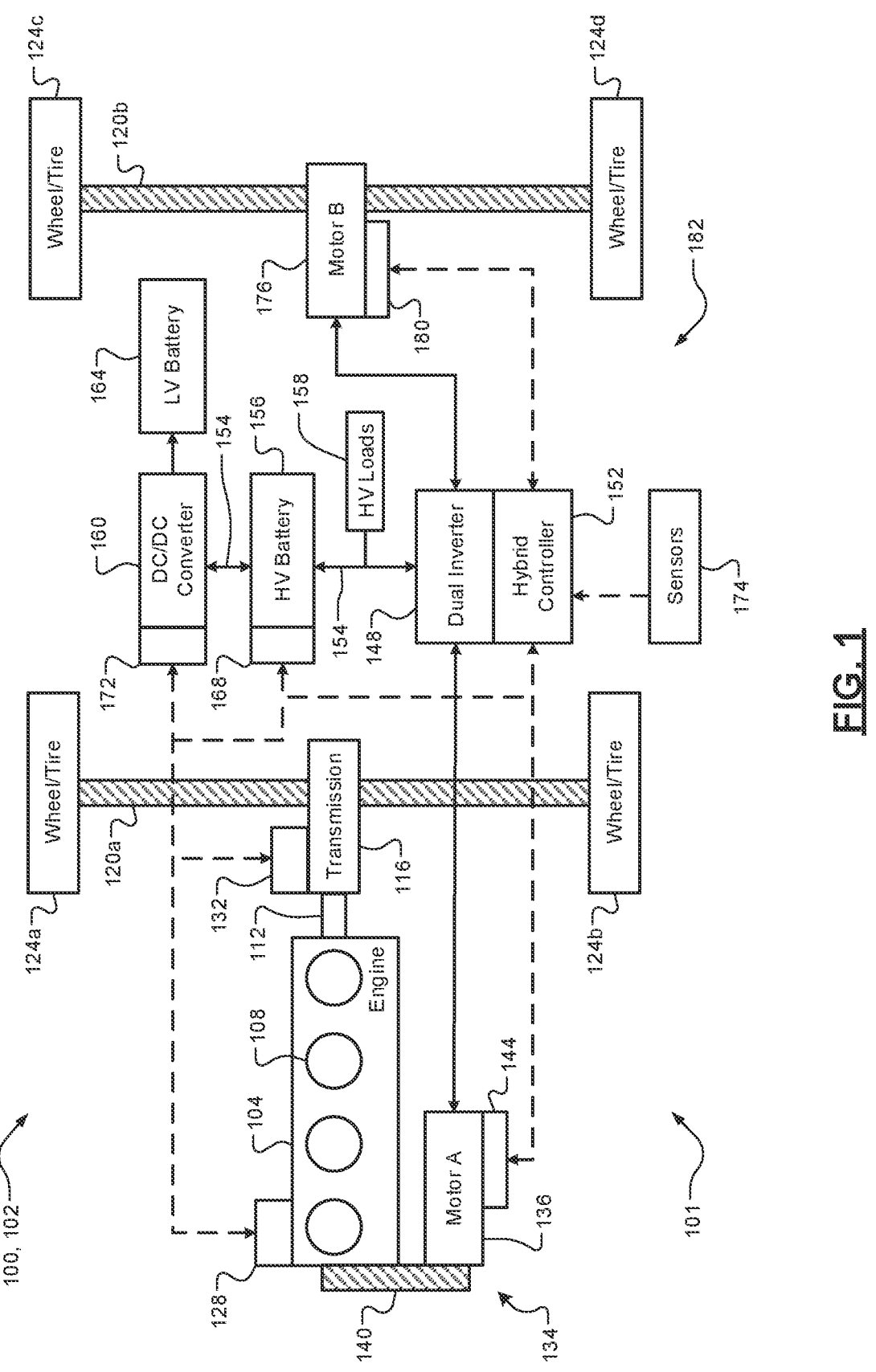
FIG. 1 is a functional block diagram of an electrified vehicle having an example energy management system according to the principles of the present application.

Referring now to FIG. 1, a functional block diagram of an electrified vehicle 100 having an example energy management system 101 according to the principles of the present application is illustrated. In one exemplary implementation, the electrified vehicle 100 is a plug-in hybrid electric vehicle (PHEV) capable of recharging at least one HV battery system via both an external charging station (roadside, residential, etc.) and electrified vehicle supply equipment (EVSE) and during operation of the electrified vehicle 100. While a PHEV configuration is specifically described, it will be appreciated that the electrified vehicle 100 could be any suitable electrified vehicle having both an internal combustion engine and at least one electric motor associated with the engine. While a HV battery-equipped electrified vehicle 100 is shown and generally described herein, it will be appreciated that the techniques of the present application are not limited to HV battery systems and are applicable to any suitable energy storage system. Thus, the term "energy storage system" as used herein could also be applicable to, for example, fuel cell electrified vehicles (FCEVs), which have hydrogen (H2) as stored energy. The proposed techniques provide optimized control for an electrified vehicle's energy storage comprising any of chemical, electrical, pneumatic, thermal, kinetic, and potential energy—where some could be unidirectional (e.g., gasoline or diesel) and some could be bi-directional (electrical, pneumatic, etc.). The "SOC" for the "HV battery system" as discussed herein throughout could therefore also refer to a "target capacity" or "target stored energy" of the "energy storage system."

The electrified vehicle 100 has an electrified powertrain 102 including an internal combustion engine 104 that is configured to combust a mixture of air and fuel (diesel, gasoline, etc.) within cylinders 108 to drive pistons (not shown) that generate torque at a crankshaft 112, which could be used for vehicle propulsion and/or battery system recharging. While only four cylinders are shown, it will be appreciated that the engine 104 could include any suitable number of cylinders. The drive torque at the crankshaft 112 is transferred by a transmission 116 (e.g., a multi-speed automatic transmission) to a first axle 120a (e.g., a front axle) of the electrified vehicle 100. The first axle 120a is in turn connected to first wheels/tires 124a, 124b. The engine 104 is controlled by a respective control unit/module 128 (e.g., an engine control module, or ECM), and the transmission 116 is controlled by a respective control unit/module 132 (e.g., a transmission control module, or TCM). A first electric motor 136 ("Motor A") is coupled to the crankshaft 112 by a wearable drive device 140 such as a belt. It will be appreciated that the electric motor 136 and the belt 140 could be part of a BSG unit 134 or another FEAD system. The electric motor 136 is capable of acting both as a torque provider by providing torque to the crankshaft 112 (e.g., to start the engine 104) and a torque consumer by converting a portion of the drive torque at the crankshaft 112 into electrical energy (e.g., similar to a conventional alternator).

The electric motor 136 (i.e., the BSG unit 134) is capable of quickly starting the engine 104, such as in response to an electric-only to parallel mode transition being initiated. The BSG unit 134 could also be utilized to provide additional or supplemental drive torque at the front axle 120a. The electric motor 136 is controlled by a respective control unit/module 144. The electric motor 136 either receives electrical energy from or provides electrical energy to a dual inverter 148. A hybrid controller 152 (e.g., a hybrid control processor, or HCP) utilizes some type of interface (software, controller area network (CAN), etc.) to communicate torque requests to intermediate motor control processors (MCPs, e.g., units/modules 144, 180). This hybrid controller 152 also communicates with the other control modules/units such that the vehicle 100 generates a desired drive torque, e.g., based on a driver torque request. The dual inverter 148 is also connected to an HV bus 154, and in turn to an HV battery system 156. Also connected to HV bus 154 is a set of HV loads 158, which could include, but are not limited to, HVAC components such as pumps, compressors, fans, heaters, and the like (e.g., an electric air compressor and/or an electric coolant heater). While a single HV battery system 156 is shown, it will be appreciated that there could be two HV battery systems 156 (e.g., one per electric motor) and that there could be two inverters (i.e., one per electric motor 136, 176, each having its own set of insulated bipolar gate transistors or IGBTs).

The dual inverter 148 converts alternating current (AC) (to/from the electric motor 136) into direct current (DC) (to/from the HV battery system 156 and vice-versa. The HV battery system 156 is connected to a DC-DC converter 160 (which could be one of the HV loads 158), which steps-down a voltage of the HV battery system 156 to recharge a low voltage (LV) battery 164, such as a 12 volt (V) lead-acid or lithium-ion (Li-ion) battery system. The HV battery system 156 is controlled by a respective control unit/module 168 and the DC-DC converter 160 is controlled by a respective control unit/module 172, both of which are also in communication with the hybrid controller 152. The hybrid controller 152 also receives measurements from other sensors 174, such as, but not limited to, a wheel speed sensor, a vehicle speed sensor, a steering wheel angle sensor, a yaw rate sensor, and a lateral acceleration sensor.

The electrified powertrain 102 further includes a second electric motor 176 ("Motor B"). This electric motor 176 could also be referred to as a traction motor because it provides drive torque to a second axle 120b (e.g., a rear axle), which is in turn connected to second wheels/tires 124c, 124d. It will be appreciated that the term "axle" as used herein includes a solid axle, half shafts, or any other suitable axle configuration. It will also be appreciated that the axles 120a, 120b could have the same axle configuration or different axle configurations. The electric motor 176 receives electrical energy (AC) from the dual inverter 148 in order to generate this drive torque. The electric motor 176 is controlled by a respective control module/unit 180, which is also in communication with the hybrid controller 152. It will be appreciated that these various controllers and control units/modules 128, 132, 152, 168, 172, 180 are collectively referred to herein as "a control system" and generally referenced as 182. The specific operation of the control system 182 as it relates to the techniques of the present application, including specific equations utilized, will now be described in greater detail.

While the electrified powertrain 102 is shown and described as having electric motors 136, 176 associated with different front/rear axles 120a, 120b, it will be appreciated that this is merely one non-limiting exemplary configuration and that the techniques of the present application are applicable to any multi-motor electrified powertrain. For example, in another example configuration of the electrified powertrain 102, both electric motors 136, 176 could be configured to apply torque at the same one axle in the following series configuration to: BSG (including the first electric motor)—engine—clutch—second electric motor—transmission. It will also be appreciated that these are merely example configurations and that the electrified vehicle 100 could include the engine 104 and only one electric motor and one respective HV bus and HV battery system.

Figure 2:
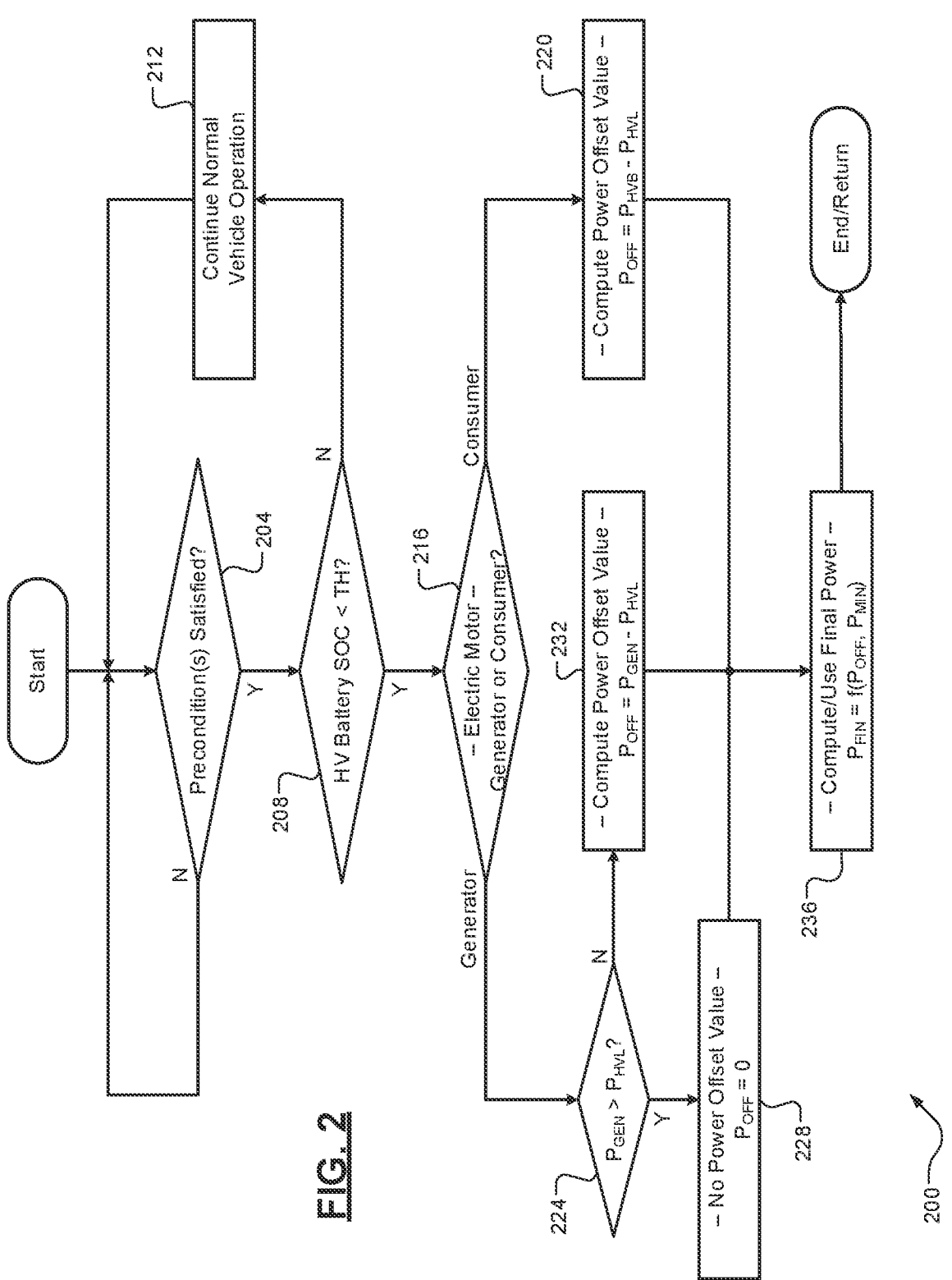
FIG. 2 is a flow diagram of an example energy management method for an electrified vehicle according to the principles of the present application.

Referring now to FIG. 2 and with continued reference to FIG. 1, a flow diagram of an example energy control method 200 for an electrified vehicle according to the principles of the present application is illustrated. While the electrified vehicle 100 and its components are specifically referenced for illustrative/descriptive purposes, it will be appreciated that the method 200 could be applicable to any suitably configured electrified vehicle. At 204, the control system 182 determines whether an optional set of one or more preconditions are satisfied. This could include, for example only, the electrified vehicle 100 being powered up and running and there being no malfunctions or faults present that would otherwise affect the operation of the method 200 and the electrified vehicle 100. When false, the method 200 ends or returns to 204.

When true, the method 200 continues to 208. At 208, the control system 182 determines (e.g., based on measurements from the sensor(s) 172) whether the SOC of the HV battery system 156 is less than an SOC threshold (TH) indicative of an SOC level where the HV battery system 156 may be unable to fully support the HV bus 154 (e.g., if all of the expected or possible HV loads 158 were running). This SOC threshold TH could be predetermined or predefined (e.g., based on empirical data) or otherwise calculated/determined based on other parameters. For example only, the SOC threshold could be equal to or approximately equal to 30%. When false, the method 200 proceeds to 212 where normal operation of the electrified vehicle 100 continues and the method 200 then ends or returns to 204. In other words, when the SOC is not below the SOC threshold TH, the remainder of the method 200 (i.e., the energy management techniques described herein) are not necessary and thus are not utilized. When true, however, the method 200 proceeds or continues to 216.

At 216, the control system 182 determines whether the electric motor (e.g., motor 136 or Motor A) is operating as a generator or a consumer. In other words, it is determined whether the electric motor 136 is generating (providing) or consuming (drawing) power to/from the HV bus 154. When the electric motor 136 is operating as a consumer, the method 200 proceeds to 220 where the control system 182 computes or calculates the power offset value ($P_{OFF}$) as a difference between the power available in the HV battery system 156 ($P_{HVB}$) and the power draw from the set of HV loads 158 ($P_{HVL}$), or $P_{OFF}=P_{HVB}-P_{HVL}$. The method 200 then continues to 236, which is described in greater detail below.

At 216, when it is determined that the electric motor 136 is operating as a generator, the method 200 proceeds to 224. At 224, the control system 182 determines whether the power generated by the electric motor 136 ($P_{GEN}$) is greater than the HV load power draw $P_{HVL}$. When true, the method 200 proceeds to 228 where the control system 182 does not set a power offset value ($P_{OFF}=0$) and the method 200 continues to 236. When false, the method 200 proceeds to 232 where the control system 182 computes or calculates the power offset value $P_{OFF}$ as a difference between the electric motor generated power $P_{GEN}$ and the HV load power draw $P_{HVL}$, or $P_{OFF}=P_{GEN}-P_{HVL}$. The method 200 then continues to 236. At 236, the control system 182 computes/calculates and uses a final power value or final discharge value ($P_{FIN}$) based on (e.g., as a function of) the power offset value $P_{OFF}$ and a minimum power for any of the HV loads 158 identifies as critical HV loads ($P_{MIN}$), or $P_{FIN}=f(P_{OFF}, P_{MIN})$. These critical HV loads 158 could be predefined for an average user (e.g., HVAC-related components) or could be otherwise set/adjusted (e.g., user-configurable or specifiable). The method 200 then ends or returns to 204 for one or more additional cycles.

It will be appreciated that the reactive systems and methods, I contrast to the conventional predictive systems and methods that only picked one of HV battery system recharging and HV load powering, could further employ a cost-based analysis. That is, the systems and methods of the present application could decide whether to adjust the existing/current load sharing based on whether the benefit significantly outweighs a corresponding cost. In other words, the systems and methods of the present application may not be overly dynamic for a variety of reasons, including not being categorized as a defeat device for emissions regulations purposes. For example only, when the engine is on/running, supporting the HV bus at a minimum SOC threshold of the HV battery system at approximately 13.5% could be deemed acceptable, whereas allowing the HV battery system to fall or be maintained at lower SOC threshold levels (e.g., ~8%) could be considered too drastic as there is not enough HV battery system power to handle any upcoming scenario/maneuver.

It will be appreciated that the term "controller" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An energy management system for an electrified vehicle having an electrified powertrain including an electric motor connected to an internal combustion engine, the energy management system comprising:

a set of sensors configured to obtain a set of parameters of the electrified powertrain indicative of (i) a state of charge (SOC) of a high voltage (HV) battery system connected to a HV bus that provides/receives electrical power to/from the electric motor and (ii) a set of HV loads on the HV bus corresponding to a set of HV components connected to the HV bus, wherein the set of HV components does not include any propulsion components of the electrified powertrain; and a control system in communication with the set of sensors and configured to determine whether the SOC of the HV battery system is below an SOC threshold and, when the SOC of the HV battery system is below the SOC threshold:

determine whether the electric motor is operating as a generator or a consumer;

when the electric motor is operating as a consumer, calculate a power offset value based on a difference between an available power of the HV battery system and the set of HV loads;

when the electric motor is operating as a generator and its generated power is less than the set of HV loads, calculate the power offset value based on a difference between the generated power and the set of HV loads; and control the set of HV loads using a final output power calculated based on the power offset value and a minimum power for the set of HV loads.

2. The energy management system of claim 1, wherein the controller is further configured to when the electric motor is operating as a generator and its generated power is greater than the set of HV loads, set the power offset value to zero.

3. The energy management system of claim 1, wherein the control of the set of HV loads using the final output power includes providing at least some of the set of HV loads less power than desired.

4. The energy management system of claim 1, wherein the control of the set of HV loads using the final output power includes disabling at least one of the set of HV loads that is not identified as a critical HV load.

5. The energy management system of claim 1, wherein the set of HV loads includes a direct current to direct current (DC-DC) converter.

6. The energy management system of claim 1, wherein the set of HV loads include an electric air compressor.

7. The energy management system of claim 1, wherein the set of HV loads includes an electric coolant heater.

8. The energy management system of claim 1, wherein the electrified vehicle is a plug-in hybrid electric vehicle (PHEV) having the engine and a first electric motor associated with a transmission and a first axle and a second electric motor associated with a different second axle.

9. An energy management method for an electrified vehicle having an electrified powertrain including an electric motor connected to an internal combustion engine, the energy management method comprising:

providing a set of sensors configured to obtain a set of parameters of the electrified powertrain indicative of (i) a state of charge (SOC) of a high voltage (HV) battery system connected to a HV bus that provides/receives electrical power to/from the electric motor and (ii) a set of HV loads on the HV bus corresponding to a set of HV components connected to the HV bus, wherein the set of HV components does not include any propulsion components of the electrified powertrain;

determining, by a control system and using a set of sensors, whether the SOC of the HV battery system is below an SOC threshold; and when the SOC of the HV battery system is below the SOC threshold:

determining, by the control system, whether the electric motor is operating as a generator or a consumer;

when the electric motor is operating as a consumer, calculating, by the control system, a power offset value based on a difference between an available power of the HV battery system and the set of HV loads;

when the electric motor is operating as a generator and its generated power is less than the set of HV loads, calculating, by the control system, the power offset value based on a difference between the generated power and the set of HV loads; and controlling, by the control system, the set of HV loads using a final output power calculated based on the power offset value and a minimum power for the set of HV loads.

10. The energy management method of claim 9, further comprising when the electric motor is operating as a generator and its generated power is greater than the set of HV loads, setting, by the control system, the power offset value to zero.

11. The energy management method of claim 9, wherein the controlling of the set of HV loads using the final output power includes providing at least some of the set of HV loads less power than desired.

12. The energy management method of claim 9, wherein the controlling of the set of HV loads using the final output power includes disabling at least one of the set of HV loads that is not identified as a critical HV load.

13. The energy management method of claim 9, wherein the set of HV loads includes a direct current to direct current (DC-DC) converter.

14. The energy management method of claim 9, wherein the set of HV loads include an electric air compressor.

15. The energy management method of claim 9, wherein the set of HV loads includes an electric coolant heater.

16. The energy management method of claim 9, wherein the electrified vehicle is a plug-in hybrid electric vehicle (PHEV) having the engine and a first electric motor associated with a transmission and a first axle and a second electric motor associated with a different second axle.

* * * * *